(12) United States Patent
Wang et al.

(10) Patent No.: US 7,898,156 B2
(45) Date of Patent: Mar. 1, 2011

(54) MUSCLE-DRIVEN NANOGENERATORS

(75) Inventors: Zhong L. Wang, Marietta, GA (US);
Rusen Yang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 197 days.

(21) Appl. No.: 12/397,832

(22) Filed: Mar. 4, 2009

(65) Prior Publication Data

US 2009/0226768 A1 Sep. 10, 2009

Related U.S. Application Data

(60) Provisional application No. 61/033,642, filed on Mar. 4, 2008, provisional application No. 61/039,982, filed on Mar. 27, 2008.

(51) Int. Cl.
*H01L 41/113* (2006.01)
(52) U.S. Cl. ......................................................... 310/339
(58) Field of Classification Search .................... 310/339
See application file for complete search history.

(56) References Cited

U.S. PATENT DOCUMENTS

| | | |
|---|---|---|
| 2003/0205657 A1 | 11/2003 | Voisin |
| 2004/0127025 A1 | 7/2004 | Crocker, Jr. et al. |
| 2005/0188751 A1 | 9/2005 | Puskas |
| 2005/0242366 A1 | 11/2005 | Parikh et al. |
| 2009/0115293 A1* | 5/2009 | Wang et al. .................. 310/364 |
| 2009/0171448 A1* | 7/2009 | Eli ............................... 623/1.32 |

FOREIGN PATENT DOCUMENTS

WO WO-2008-027078 A3 * 3/2008

OTHER PUBLICATIONS

Jeon et al., "MEMS power generator with transverse mode thin film PCT," Science Direct, vol. 122, Issue 1, Jul. 29, 2005, pp. 16-22.
Gao et al., Nanoarchitectures of semiconducting and piezoelectric zinc oxide, J. Applied Physics 97, 044304 (2005).
Wang et al., "Large-Size Liftable Inverted-Nanobowl Sheets as Reusable Masks for Nanolithography," Nano Letters, vol. 5, No. 9, 2005, 1748-1788.
Lao et al., "Formation of double-side teethed nanocombs of ZnO and self-catalysis of Zn-terminated polar surface," Chemical Physics Letters, Elsevier B.V., 2005.
Jeon et al., "MEMS power generator with transverse mode thin film PZT," Sensors and Actuators A Physical, Elsevier, (2005).

(Continued)

*Primary Examiner* — Thomas M Dougherty
(74) *Attorney, Agent, or Firm* — Bryan W. Bockhop; Bockhop & Associates, LLC

(57) ABSTRACT

In a method of generating electricity, a plurality of living cells are grown on an array of piezoelectric nanowires so that the cells engage the piezoelectric nanowires. Induced static potentials are extracted from at least one of the piezoelectric nanowires when at least one of the cells deforms the at least one of the piezoelectric nanowires. A cell-driven electrical generator that includes a substrate and a plurality of spaced-apart piezoelectric nanowires disposed on the substrate. A plurality of spaced-apart conductive electrodes interact with the plurality of piezoelectric nanowires. A biological buffer layer that is configured to promote growth of cells is disposed on the substrate so that cells placed on the substrate will grow and engage the piezoelectric nanowires.

15 Claims, 3 Drawing Sheets

OTHER PUBLICATIONS

Lao et al., "Formation of double-side teethed nanocombs of ZnO and self-calalysis of Zn-terminated polar surface," Chemical Physics Letters (Science Direct), (Abstract), 2007.

Wang et al., "Large-Size Liftable Inverted-Nanobowl Sheets as REusable Masks for Nanolithography," Nano Letters, vol. 5, (Abstract), 2005.

Wang et al., "Piezoelectric Nanogenerators Based on Zinc Oxide Nanowire Arrays," Science, vol. 312, pp. 242-245, Apr. 14, 2006.

Peck-Radosavjevic et al., "Thrombopoietin induces rapid resolution of thrombocytopenia after orthotopic liver transplantation through increased platelet production," Blood, vol. 95, No. 3, (2000).

* cited by examiner

MUSCLE-DRIVEN NANOGENERATORS

CROSS-REFERENCE TO RELATED APPLICATION(S)

This application claims the benefit of U.S. Provisional Patent Application Ser. No. 61/033,642, filed Mar. 4, 2008; and U.S. Provisional Patent Application Ser. No. 61/039,982, filed Mar. 27, 2008 the entirety of each of which is hereby incorporated herein by reference.

STATEMENT OF GOVERNMENT INTEREST

This invention was made with support from the U.S. government under grant number DE-FG02-07ER46394, awarded by the Department of Energy and grant number NCC3-982, awarded by the National Aeronautics and Space Administration and grant number IU54CA 119338, awarded by the National Institutes of Health. The government may have certain rights in the invention.

BACKGROUND OF THE INVENTION

1. Field of the Invention

The present invention relates to nano-scale energy harvesting devices and, more specifically, to a device for harvesting energy from muscle action.

2. Description of the Prior Art

Nanotechnology has a substantial potential in the biomedical sciences. Many nanodevices are being developed to work in concert with biological systems. Such systems under development include: devices for diagnosing medical conditions and for treating diseases; sensor systems, such as artificial light and sound sensors; and neural communication systems, such as systems for communicating neural potentials to computers and muscles. Generally, it is expected that nanodevices will become powerful tools in human and animal health treatment in the coming decades.

A reliable power source will be a requirement for almost all such nanosystems. Current possible power sources include batteries and externally-excited generators. While progress has been made in reducing the size of batteries, such progress is limited by the complexity of the components of batteries as they approach the nanoscale. Also, batteries have the disadvantage of requiring periodic replacement or recharging. Externally-excited generators (e.g., radio frequency coils) also have problems with scaling and require an external power source (such as a radio frequency signal generator) to be present for the generator to work.

Therefore, there is a need for a small scale generator that does not require periodic replacement or recharging.

There is also a need for a small scale generator that does not require an external device to generate power.

SUMMARY OF THE INVENTION

The disadvantages of the prior art are overcome by the present invention which, in one aspect, is a method of generating electricity, in which a plurality of living cells are grown on an array of piezoelectric nanowires so that the cells engage the piezoelectric nanowires. Induced static potentials are extracted from at least one of the piezoelectric nanowires when at least one of the cells deforms the at least one of the piezoelectric nanowires.

In another aspect, the invention is a cell-driven electrical generator that includes a substrate. A plurality of spaced-apart piezoelectric nanowires is disposed on the substrate. A plurality of spaced-apart conductive electrodes is disposed on the substrate and in electrical communication with the plurality of piezoelectric nanowires. A biological buffer layer that is configured to promote growth of cells is disposed on the substrate so that cells placed on the substrate will grow and engage the piezoelectric nanowires.

In yet another aspect, the invention is a biologically-driven generator that includes a biocompatible substrate. A plurality piezoelectric nanowires extends upwardly from the substrate. A biological buffer is disposed around a portion of the piezoelectric nanowires. The biological buffer is configured to promote growth of cellular tissue and engagement of cellular tissue with the piezoelectric nanowires. A plurality of conductive electrode tips is disposed so as to engage the plurality of piezoelectric nanowires so that a Schottky barrier exists between selected ones of the plurality of piezoelectric nanowires and selected ones of the plurality of conductive electrode tips when the selected ones of the plurality of piezoelectric nanowires become deformed.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
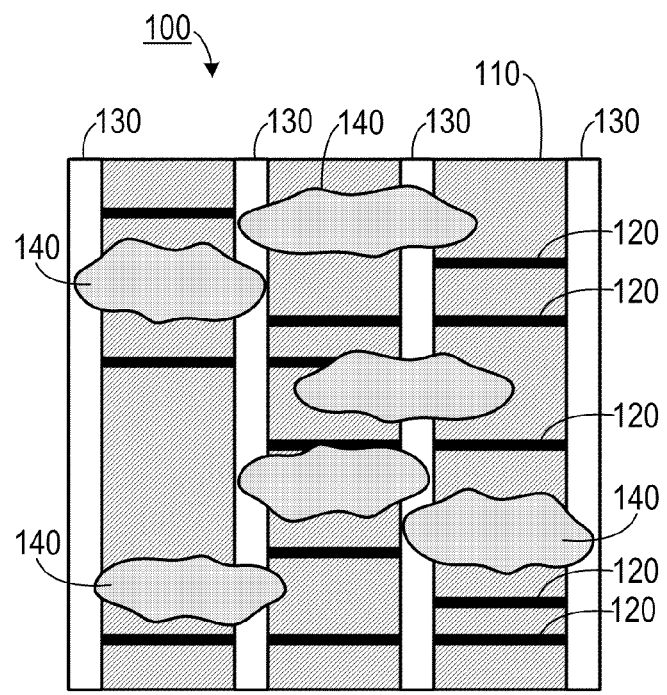
FIG. 1A is a plan schematic view of one embodiment of a cell-driven nanogenerator.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relevant to the disclosure that follows, the growth of ZnO nanorods is disclosed in more detail in U.S. patent application Ser. No. 11/608,865, filed on Dec. 11, 2006 by Wang et al. and U.S. Pat. No. 7,220,310, issued on May 22, 2007 to Wang et al. and U.S. Pat No. 7,351,607, issued on Apr. 1, 2008 to Wang et al., the entirety of each of which is hereby incorporated by reference. The making of components employed in nanogenerators is generally disclosed in more detail in U.S. patent application Ser. No. 12/209,310, filed on Sep. 12, 2008 by Wang et al., the entirety of which is also hereby incorporated by reference.

Figure 1B:
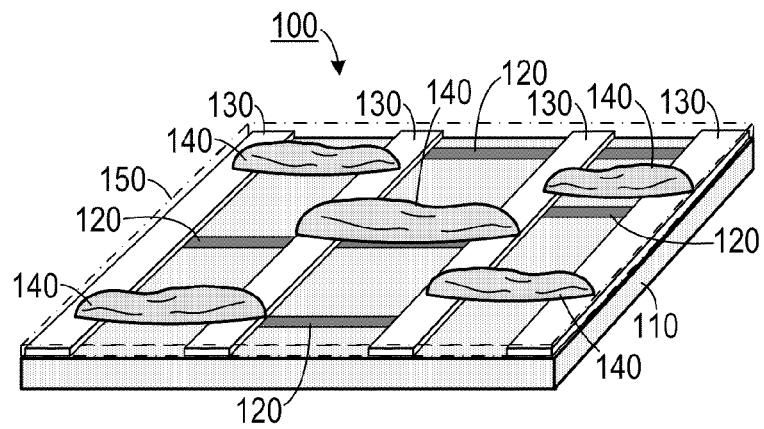
FIG. 1B is a top perspective view of the embodiment shown in FIG. 1A.
Figure 2A:
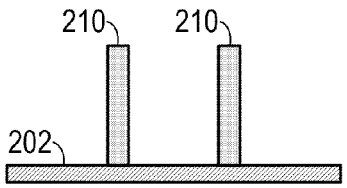
FIGS. 2A-2D are a series of elevational schematic views demonstrating a method of making a bottom portion of a second embodiment of a cell-driven nanogenerator.
Figure 2B:
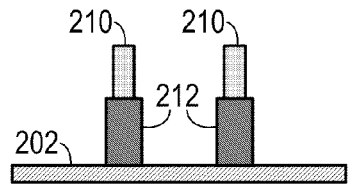
Figure 2C:
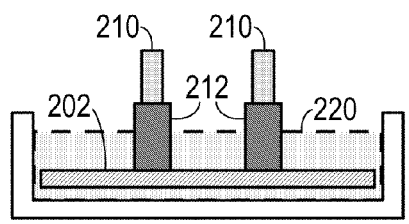
Figure 2D:
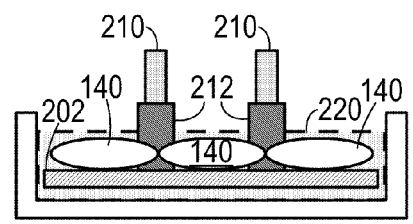

As shown in FIGS. 1A-1B, one embodiment is a cell-driven electrical generator 100 that includes a flexible substrate 110. A plurality of spaced-apart piezoelectric nanowires 120, such as zinc oxide nanowires, are disposed along a first common orientation on the substrate 110. A plurality of spaced-apart conductive electrodes 130 is disposed on the substrate and is in electrical communication with the plurality of piezoelectric nanowires 120. The plurality of spaced-apart conductive electrodes 130 are disposed along a second common orientation on the substrate 110, which is transverse to the first common orientation. A biological buffer layer 150, which includes a cell nutrient, is configured to promote growth of cells 140 and is disposed on the substrate 110. (The selection of the cell nutrient depends on the specific cell type being cultured on the substrate 110. However, many different nutrients and other cell growth factors, which may be used in the present embodiment, are well known to the biochemical arts.) Cells 140 placed on the substrate will grow as a result of the biological buffer layer 150 and will engage the piezoelectric nanowires 120.

In operation, the living cells (which could be muscle cells) are grown on the substrate 110 so that they engage the piezoelectric nanowires 120. When the cells 140 change shape (e.g., through expanding or contracting), they induce static potentials in the piezoelectric nanowires 120. Because the conductive electrodes 130 form a Schottky barrier with the piezoelectric nanowires 120, the induced static potentials may be extracted from the piezoelectric nanowires 120.

As shown in FIGS. 2A-2D, another embodiment may be made by growing piezoelectric nanowires 210, such as zinc oxide nanowires, vertically from a biocompatible substrate 202. The substrate 202 could include a material such as, for example, Si, $SiO_2$, Au, Ti, a polymer, PDMS, and SU8. A biocompatible insulation layer 212 is disposed about a bottom portion of each of the plurality of piezoelectric nanowires 210. The biocompatible insulation layer 212 could include such materials as $SiO_2$, SU8, and SiN coated by PDMS. The biocompatible insulation layer 212 could be applied as a layer and then etched using known photolithographic techniques to achieve the coating at the base of the nanowires 210. The substrate 200, the nanowires 210 and the insulation 212 is placed in a biological buffer 220 that promotes cell 140 growth and cellular engagement with the piezoelectric nanowires 210.

Figure 3A:
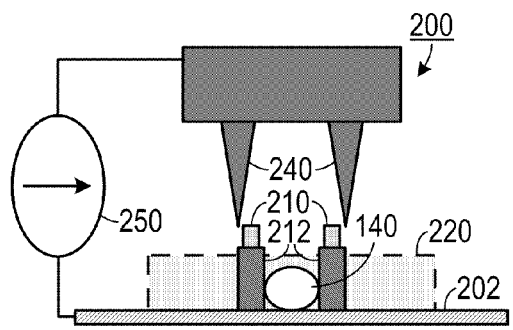
FIGS. 3A-3B are a pair of elevational schematic views demonstrating the effect of cellular expansion.
Figure 4A:
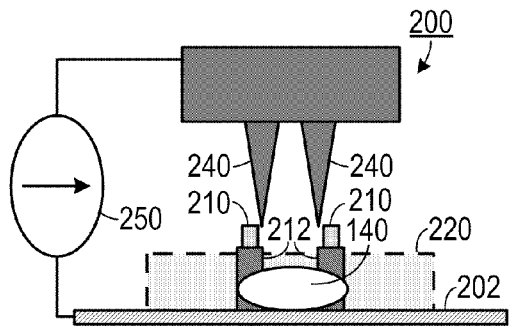
FIGS. 4A-4B are a pair of elevational schematic views demonstrating the effect of cellular contraction.
Figure 3B:
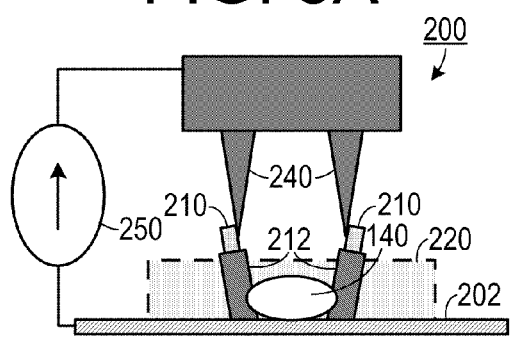
Figure 4B:
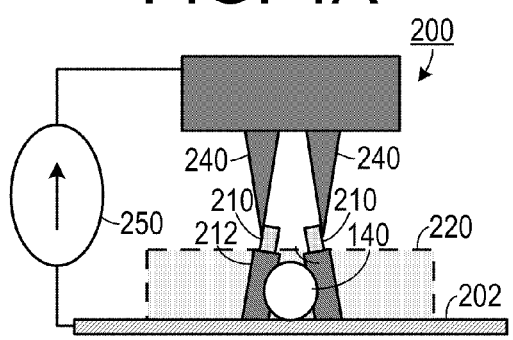

As shown in FIGS. 3A-3B and 4A-4B, a plurality of conductive electrode tips 240 is placed opposite of the exposed portion of the piezoelectric nanowires 210. When the piezoelectric nanowires 210 are in contact with the conductive electrode tips 240, a Schottky barrier will form therebetween so that current will flow in a single direction when the piezoelectric nanowires 210 become deformed. A configuration used with expanding cells 140 is show in FIGS. 3A and 3B. A cell at rest is shown in FIG. 3A, whereas the effect on an electrical load 250 by an expanded cell 140 is shown in FIG. 3B. A configuration used with contracting cells 140 is shown in FIGS. 4A-4B. A cell 140 at rest is shown in FIG. 4A, whereas the contracted cell 140 is shown in FIG. 4B.

Figure 5:
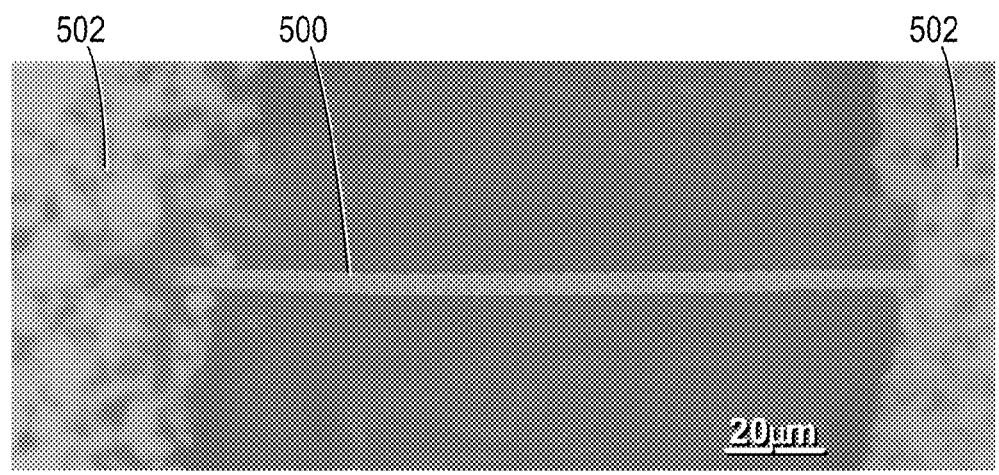
FIG. 5 is a micrograph of a piezoelectric nanowire disposed between two conductors.
Figure 6:
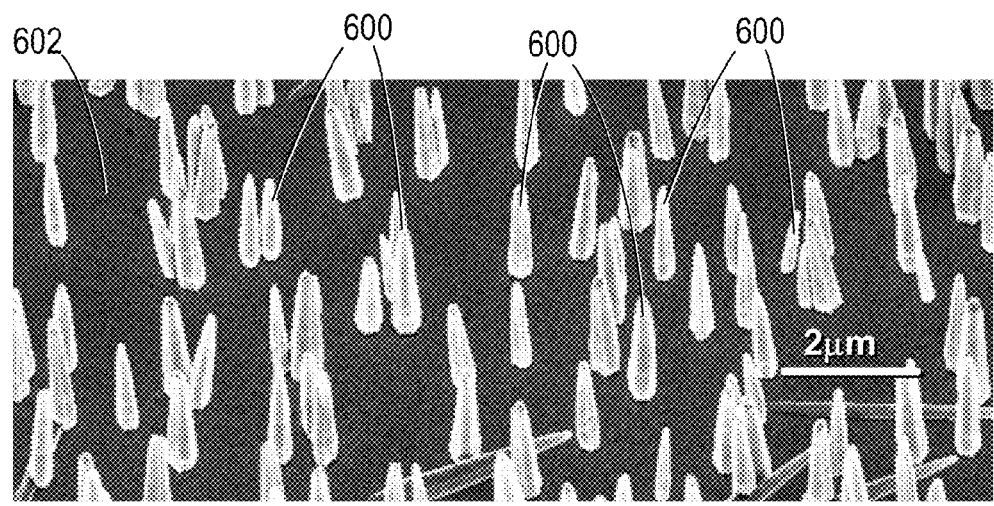
FIG. 6 is a micrograph of a plurality of nanoscale conductors.

A micrograph of a piezoelectric nanowire 500 coupled between two conductive electrodes 502 is shown in FIG. 5. A plurality of conductive electrode tips 600 extending from a substrate 602 is shown in FIG. 6.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of generating electricity, comprising the actions of:
   a. growing a plurality of living cells on an array of piezoelectric nanowires so that the cells engage the piezoelectric nanowires; and
   b. extracting induced static potentials from at least one of the piezoelectric nanowires when at least one of the cells deforms the at least one of the piezoelectric nanowires.

2. The method of claim 1, wherein the extracting action includes applying a conductor to a selected location of the at least one of the piezoelectric nanowires, thereby creating a Schottky barrier therebetween.

3. The method of claim 1, further comprising the action of applying a cell nutrient to the array of piezoelectric nanowires so as to encourage cell growth.

4. The method of claim 1, wherein the array of piezoelectric nanowires are part of a generator that includes:
   a. a flexible substrate;
   b. a plurality of spaced-apart zinc oxide nanowires disposed on the substrate along a first orientation;
   c. a plurality of spaced-apart conductive electrodes disposed on the substrate along a second orientation that is transverse to the first orientation and in electrical communication with the plurality of piezoelectric nanowires; and
   d. a biological buffer layer that is configured to promote growth of cells disposed on the substrate so that cells placed on the substrate will grow and engage the piezoelectric nanowires.

5. The method of claim 1, wherein the array of piezoelectric nanowires are part of a generator that includes:
   a. a biocompatible substrate;
   b. a plurality piezoelectric zinc oxide nanowires extending upwardly from the substrate;
   c. a biological buffer disposed around a portion of the piezoelectric nanowires that is configured to promote growth of cellular tissue and engagement of cellular tissue with the piezoelectric nanowires; and
   d. a plurality of conductive electrode tips disposed so as to engage the plurality of piezoelectric nanowires so that a Schottky barrier exists between selected ones of the plurality of piezoelectric nanowires and selected ones of the plurality of conductive electrode tips when the selected ones of the plurality of piezoelectric nanowires become deformed.

6. A cell-driven electrical generator, comprising:
   a. a substrate;
   b. a plurality of spaced-apart piezoelectric nanowires disposed on the substrate;
   c. a plurality of spaced-apart conductive electrodes disposed on the substrate and in electrical communication with the plurality of piezoelectric nanowires; and
   d. a biological buffer layer that is configured to promote growth of cells disposed on the substrate so that cells placed on the substrate will grow and engage the piezoelectric nanowires.

7. The cell-driven electrical generator of claim 6, wherein the substrate comprises a flexible substrate.

8. The cell-driven electrical generator of claim 6, wherein the plurality of spaced-apart piezoelectric nanowires are disposed along a first common orientation on the substrate.

9. The cell-driven electrical generator of claim 6, the plurality of spaced-apart conductive electrodes are disposed along a second common orientation on the substrate, the second common orientation being transverse to the first common orientation.

10. The cell-driven electrical generator of claim 6, wherein the plurality of spaced-apart piezoelectric nanowires comprise zinc oxide.

11. A biologically-driven generator, comprising:
   a. a biocompatible substrate;
   b. a plurality piezoelectric nanowires extending upwardly from the substrate;
   c. a biological buffer disposed around a portion of the piezoelectric nanowires that is configured to promote growth of cellular tissue and engagement of cellular tissue with the piezoelectric nanowires; and
   d. a plurality of conductive electrode tips disposed so as to engage the plurality of piezoelectric nanowires so that a Schottky barrier exists between selected ones of the plurality of piezoelectric nanowires and selected ones of the plurality of conductive electrode tips when the selected ones of the plurality of piezoelectric nanowires become deformed.

12. The biologically-driven generator of claim 11, wherein the plurality piezoelectric nanowires comprise zinc oxide.

13. The biologically-driven generator of claim 11, wherein the biocompatible substrate comprises a material selected from a group consisting of: Si, SiO2, Au, Ti, a polymer, PDMS, SU8, and combinations thereof.

14. The biologically-driven generator of claim 11, further comprising a biocompatible insulation layer disposed about a portion of each of the plurality of piezoelectric nanowires.

15. The biologically-driven generator of claim 14, wherein the biocompatible insulation layer comprises a material selected from a group consisting of: $SiO_2$, SU8, and SiN coated by PDMS and combinations thereof.

* * * * *